US009309619B2

(12) United States Patent
Mistry et al.

(10) Patent No.: US 9,309,619 B2
(45) Date of Patent: Apr. 12, 2016

(54) METHOD AND APPARATUS FOR SURFACE TREATMENT OF MATERIALS UTILIZING MULTIPLE COMBINED ENERGY SOURCES

(75) Inventors: Pravin Mistry, Yorkshire (GB); Jahr Turchan, Northville, MI (US)

(73) Assignee: MTIX Ltd., Honley, West Yorkshire (GB)

( * ) Notice: Subject to any disclaimer, the term of this patent is extended or adjusted under 35 U.S.C. 154(b) by 861 days.

(21) Appl. No.: 13/536,257

(22) Filed: Jun. 28, 2012

(65) Prior Publication Data

US 2013/0001204 A1 Jan. 3, 2013

Related U.S. Application Data

(60) Provisional application No. 61/501,874, filed on Jun. 28, 2011.

(51) Int. Cl.

| | |
|---|---|
| ***B23K 9/00*** | (2006.01) |
| ***B23K 9/02*** | (2006.01) |
| ***D06M 10/02*** | (2006.01) |
| ***D06M 10/00*** | (2006.01) |
| *H05H 1/34* | (2006.01) |

(52) U.S. Cl.

CPC .......... *D06M 10/025* (2013.01); *D06M 10/005* (2013.01); *H05H 1/34* (2013.01)

(58) Field of Classification Search

CPC ............... H05H 1/34; H01L 21/67069; B23K 26/0656; B23K 26/365; C21D 10/005

USPC ............. 219/121.36, 121.48, 121.59, 121.52, 219/121.4, 121.68, 121.69, 121.85

See application file for complete search history.

(56) References Cited

U.S. PATENT DOCUMENTS

| | | | | |
|---|---|---|---|---|
| 3,466,717 | A | 9/1969 | Kuroda | |
| 3,959,104 | A * | 5/1976 | Fales | 204/164 |
| 5,413,814 | A | 5/1995 | Bowen et al. | |
| 5,554,415 | A | 9/1996 | Turchan et al. | |
| 5,601,737 | A * | 2/1997 | Asahi | B08B 7/0042 134/1 |
| 5,804,263 | A | 9/1998 | Goldberg et al. | |
| 6,200,183 | B1 * | 3/2001 | Badzian et al. | 445/24 |
| 6,203,865 | B1 * | 3/2001 | Badzian et al. | 427/596 |
| 6,370,165 | B1 * | 4/2002 | Badzian et al. | 372/7 |

(Continued)

FOREIGN PATENT DOCUMENTS

| | | |
|---|---|---|
| CN | 101 768714 A | 7/2010 |
| CN | 101 823 043 A | 9/2010 |

(Continued)

OTHER PUBLICATIONS

Plasma Applications, AST Products Inc., date unknown, 3 pages.

(Continued)

*Primary Examiner* — Dana Ross
*Assistant Examiner* — Hemant Mathew
(74) *Attorney, Agent, or Firm* — Gerald E Linden

(57) ABSTRACT

Material treatment is effected in a treatment region by at least two energy sources, such as (i) an atmospheric pressure plasma and (ii) an ultraviolet laser directed into the plasma and optionally onto the material being treated. Precursor materials may be dispensed before, and finishing material may be dispensed after treatment. Electrodes for generating the plasma may comprise two spaced-apart rollers. Nip rollers adjacent the electrode rollers define a semi-airtight cavity, and may have a metallic outer layer.

17 Claims, 6 Drawing Sheets

(56) References Cited

U.S. PATENT DOCUMENTS

| | | | | |
|---|---|---|---|---|
| 6,429,595 | B1 * | 8/2002 | Hammen et al. | 315/111.21 |
| 7,315,009 | B2 * | 1/2008 | Fujimoto | B23K 9/0026 219/121.11 |
| 2001/0047984 | A1 * | 12/2001 | Briand et al. | 219/121.64 |
| 2008/0055594 | A1 | 3/2008 | Hadidi et al. | |
| 2008/0257379 | A1 * | 10/2008 | Buske | H05H 1/34 134/1.1 |
| 2009/0120782 | A1 * | 5/2009 | Hammen et al. | 204/164 |
| 2009/0224182 | A1 * | 9/2009 | McGeoch | 250/504 R |
| 2010/0047532 | A1 | 2/2010 | Mozetic et al. | |
| 2010/0178825 | A1 | 7/2010 | Shah et al. | |
| 2010/0320176 | A1 * | 12/2010 | Mohanty et al. | 219/121.37 |
| 2011/0232653 | A1 | 9/2011 | Imashiro et al. | |

FOREIGN PATENT DOCUMENTS

| | | |
|---|---|---|
| DE | 36 19 364 | 12/1987 |
| DE | 36 19 694 | 12/1987 |
| DE | 100 53 555 A1 | 5/2002 |
| JP | S61 119676 | 6/1986 |
| JP | 2011 132053 | 7/2011 |

OTHER PUBLICATIONS

Plasma Surface Modification for Cleaning and Adhesion, Ron Nickerson, AST Products, date unknown, pages.

Emerging Applications of Atmospheric Plasma Treatment (APT) for Non-Wovens, Enercon Industries Corporation, date unknown, 2 pages.

Kinetic Theory of partially ionised reactive gas mixtures, Giovangigli et al., Physica A 327 (2003), pp. 313-348.

International Search Report, PCT/GB2012/051516.

International Search Report, PCT/US2012/071596.

* cited by examiner

METHOD AND APPARATUS FOR SURFACE TREATMENT OF MATERIALS UTILIZING MULTIPLE COMBINED ENERGY SOURCES

CROSS-REFERENCE TO RELATED APPLICATION(S)

This application claims filing date benefit from U.S. 61/501,874 filed Jun. 28, 2011.

TECHNICAL FIELD

The invention relates to surface treatment of materials and various substrates, more particularly such as textiles, and more particularly to treatment of the materials with combined multiple diverse energy sources, typically one of which may be an atmospheric plasma (AP).

BACKGROUND

Development of "smart textiles" has been an active area of interest to improve various properties such as stain resistance, waterproofing, colorfastness and other characteristics achievable through advanced treatment using plasma technologies, microwave energy sources and in some cases, chemical treatments.

Atmospheric Plasma Treatment (APT) improves fiber surface properties such as hydrophilicity without affecting the bulk properties of these fibers, and can be used by textile manufacturers and converters to improve the surface properties of natural and synthetic fibers to improve adhesion, wettability, printability, dyeability, as well as to reduce material shrinkage.

Atmospheric-pressure plasma (or AP plasma or normal pressure plasma) is the name given to the special case of a plasma in which the pressure approximately matches that of the surrounding atmosphere. AP plasmas have prominent technical significance because in contrast with low-pressure plasma or high-pressure plasma no cost-intensive reaction vessel is needed to ensure the maintenance of a pressure level differing from atmospheric pressure. Also, in many cases these AP plasmas can be easily incorporated into the production line. Various forms of plasma excitation are possible, including AC (alternating current) excitation, DC (direct current) and low-frequency excitation, excitation by means of radio waves and microwave excitation. Only AP plasmas with AC excitation, however, have attained any noteworthy industrial significance.

Generally, AP plasmas are generated by AC excitation (corona discharge) and plasma jets. In the plasma jet, a pulsed electric arc is generated by means of high-voltage discharge (5-15 kV, 10-100 kHz) in the plasma jet. A process gas, such as oil-free compressed air flowing past this discharge section, is excited and converted to the plasma state. This plasma then passes through a jet head to arrive on the surface of the material to be treated. The jet head is at earth potential and in this way largely holds back potential-carrying parts of the plasma stream. In addition, the jet head determines the geometry of the emergent beam. A plurality of jet heads may be used to interact with a corresponding area of a substrate being treated. For example, sheet materials having treatment widths of several meters can be treated by a row of jets.

AP and vacuum plasma methods have been utilized to clean and activate surfaces of materials in preparation for bonding, printing, painting, polymerizing or other functional or decorative coatings. AP processing may be preferred over vacuum plasma for continuous processing of material. Another surface treatment method utilizes microwave energy to polymerize precursor coatings.

SUMMARY

The invention is generally directed to providing improved techniques for treatment (such as surface treatment and modification) of materials, such as substrates, more particularly such as textiles (including woven or knitted textiles and nonwoven fabrics), and broadly involves the combining of various additional energy sources (such as laser irradiation) with high voltage generated plasma(s) (such as atmospheric pressure (AP) plasmas) for performing the treatments, which may alter the core of the material being treated, as well as the surface, and which may use introduced gases or precursor materials in a dry environment. Combinations of various energy sources are disclosed.

An embodiment of the invention broadly comprises method and apparatus to treat and produce technical textiles and other materials utilizing at least two combined mutually interacting energy sources such as laser and high voltage generated atmospheric (AP) plasma.

The techniques disclosed herein may readily be incorporated into a system for the automated processing of textile materials. Functionality may be achieved through non-aqueous cleaning like etching or ablating, activating by way of radical formation on the surface(s) and simultaneously and selectively increasing or decreasing desired functional properties. Properties such as hydrophobicity, hydrophilicity fire retardency, anti-microbial properties, shrink reduction, fiber scouring, water repelling, low temperature dyeing, increased dye take up and colorfastness, may be enabled or enhanced, increased or decreased, by the process(es) which produces chemical and/or morphological changes, such as radical formation on the surface of the material. Coatings of material, such as nano-scale coatings of advanced materials composition may be applied and processed.

Combining (or hybridizing) AP plasma energy with one or more additional (or secondary) energy sources such as a laser, X-ray, electron beam, microwave or other diverse energy sources may create a more effective (and commercially viable) energy milieu for substrate treatment. The secondary energy source(s) may be applied in combination (concert, simultaneously) with and/or in sequence (tandem, selectively) with the AP plasma energy to achieve desired properties.

Secondary energy sources may act upon the separately generated plasma plume and produce a more effective, energetic plasma milieu, while also having the ability to act directly on the surface and in some cases, the core of the material subjected to this hybrid treatment.

The techniques disclosed herein may be applicable, but not limited to the treatment of textiles (both organic and inorganic), paper, synthetic paper, plastic and other similar materials which are typically in flat sheet form ("yard goods"). The techniques disclosed herein may also be applied to the processing of plastic or metal extrusion, rolling mills, injection molding, spinning, carding, weaving, glass making, substrate etching and cleaning and coating of any material as well as applicability to practically any material processing technique. Rigid materials such as flat sheets of glass (such as for touch screens) may be treated by the techniques disclosed herein.

Some advantages of the present invention may include, without limitation, a method of creating a more energetic and effective plasma to clean and activate surfaces for subsequent processing or finishing. For example, ultra-violet (UV) laser radiation, either continuous wave (CW) or pulsed, may be combined with electromagnetically generated AP plasma to create a more highly ionized and energetic reaction milieu for treating surfaces. The resulting hybridized energy may have effects that are greater than the sum of its individual parts. Pulsed laser energy may be used to drive the plasma, creating waves, and the laser energy accelerates the resultant plasma waves which act upon the substrate like waves crashing on the beach.

The accelerated and more energetic plasma may initiate radicals in the fiber or surface of the treated substrate and attach ionized groups to the initiated radicals. Attachment of such functional groups as carboxyl, hydroxyl or others attach to the surface increasing polar characteristics may result in greater hydrophilicity and other desirable functional properties.

The invention advantageously combines energy sources in a controlled atmospheric environment in the presence of a material substrate. The net result may be conversion and material synthesis in the surface of the substrate—the substrate may be physically changed, in contrast with simply being coated.

In an exemplary embodiment, a high frequency RF plasma is created in an envelope (or cavity, or chamber) formed between rotating and driven rollers which extend across the width of the processing window. The plasma field generated is consistent across the width of a treatment area, and may operate at atmospheric pressure. A high power Ultra Violet UV) laser is provided for interacting with the plasma and/or the material being treated. The beam from the laser may be shaped to have a rectangular cross-section exhibiting a consistent power density over the entire treatment area. A gas delivery system may be used to combine any combination of a plurality (such as 4) of environmental gases and precursors into a single feed which populates the hybrid plasma chamber. Additionally, a spray or misting delivery system may be provided, capable of applying a thin, consistent layer of sol-gel or process accelerants to the material being treated, either pre- or post-processing.

The process of combining plasma and photonics (such as UV laser) is dry, is carried out at atmospheric pressures and uses safe and inert gases (such as Nitrogen, Oxygen, Argon & Carbon Dioxide). Changing the power intensity of the laser and the plasma, and then varying the environmental gases or the addition of sol-gels and/or other organic or inorganic precursors—i.e., changing the "recipe"—allows the system to generate a wide variety of process applications.

There are at several applications for the process, including: cleaning, preparation and performance enhancement of materials.

For cleaning, the laser may intensify the effective power of the plasma as well as acting on the substrate material in its own right.

For preparing the substrate material for secondary processing, such as dyeing, the surface of the fibers may be ablated in a controlled manner, thereby increasing the hydrophilicity of the material (such as a textile material). Additionally, be introducing environmental gases into the process zone of the system, chemistries may be created at the surface of the material (e.g., fabric) which may result in chemistries that react with a dyeing media to effect a more efficient dye penetration or a more intense coloring process or reduction of dye temperature. For example, preparing the fibers of the textile to give a better controlled uptake of chrome oxide dyes to improve the intensity of black achieved. There is, therefore, potential for this process to reduce the chemical content of dyes which could reduce both negative environmental impact and processing costs.

For Performance Enhancement, the process may achieve material synthesis in the surface of the substrate. By altering the laser and plasma frequencies and the power intensities, and introducing other materials into the process environment, the system ablates the surface of the substrate and a series of chemical reactions between the substrate and the environmental gases synthesize new materials in the surface of the fibers in the textile web.

BRIEF DESCRIPTION OF THE DRAWINGS

Reference may be made in detail to embodiments of the disclosure, some non-limiting examples of which may be illustrated in the accompanying drawing figures (FIGs). The figures are generally diagrams. Some elements in the figures may be exaggerated, others may be omitted, for illustrative clarity. The relationship(s) between different elements in the figures may be referred to by how they appear and are placed in the drawings, such as "top", "bottom", "left", "right", "above", "below", and the like. It should be understood that the phraseology and terminology employed herein is not to be construed as limiting, and is for descriptive purposes only.

DETAILED DESCRIPTION

The invention relates generally to treatment (such as surface treatment) of materials (such as textiles) to modify their properties.

Various embodiments will be described to illustrate teachings of the invention(s), and should be construed as illustrative rather than limiting. Although the invention is generally described in the context of various exemplary embodiments, it should be understood that it is not intended to limit the invention to these particular embodiments. An embodiment may be an example or implementation of one or more aspects of the invention(s). Although various features of the invention(s) may be described in the context of a single embodiment, the features may also be provided separately or in any suitable combination with one another. Conversely, although the invention(s) may be described in the context of separate embodiments, the invention(s) may also be implemented in a single embodiment.

In the main hereinafter, surface treatment of substrates which may be textiles supplied in roll form (long sheets of material rolled on a cylindrical core) will be discussed. One or more treatments, including but not limited to material synthesis, may be applied to one or both surfaces of the textile substrate, and additional materials may be introduced. As used herein, a "substrate" may be a thin "sheet" of material having two surfaces, which may be termed "front" and "back" surfaces, or "top" and "bottom" surfaces.

Some Embodiments of the Invention

The following embodiments and aspects thereof may be described and illustrated in conjunction with systems, tools and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, well-known features may be omitted or simplified in order not to obscure the descriptions of the invention(s).

Figure 1:
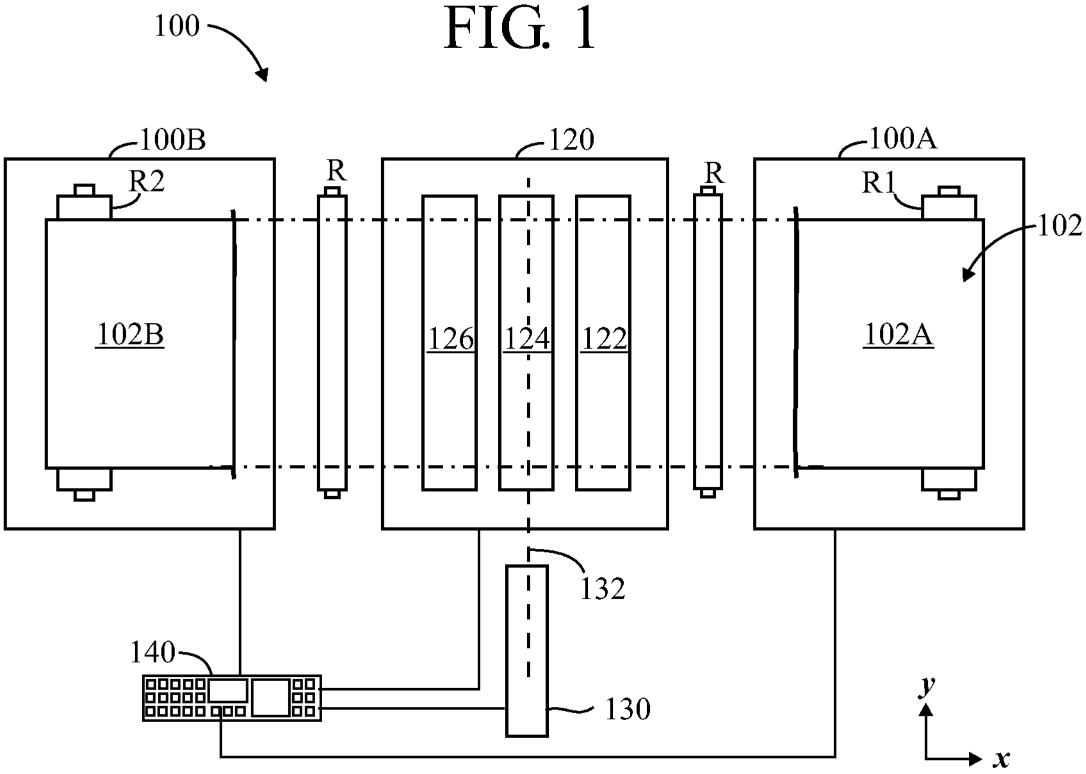
FIG. 1 is a diagram of a treatment system, according to an embodiment of the invention.

FIG. 1 shows an overall surface treatment system 100 and method of performing treatment, such as a surface treatment of a substrate 102. In the figures presented herein, the substrate 102 will be shown advancing from right-to-left through the system 100.

The substrate 102 may for example be a textile material and may be supplied as "yard goods" as a long sheet on a roll. For example, the substrate to be treated may be fibrous textile material such as cotton/polyester, approximately 1 meter wide, approximately 1 mm thick, and approximately 100 meters long.

A section 102A, such as a 1 m×1 m section of the substrate 102 which is not yet treated is illustrated paying out from a supply reel R1 at an input section 100A of the system 100. From the input section 100A, the substrate 102 passes through a treatment section 120 of the apparatus 100. After being treated, the substrate 102 exits the treatment apparatus 120, and may be collected in any suitable manner, such as wound up on a take-up reel R2. A section 102B, such as a 1 m×1 m section of the substrate 102 which has been treated is illustrated being wound onto an takeup reel R1 at an output section 100A of the system 100. Various rollers "R" may be provided between (as shown) and within (not shown) the various sections of the system 100 to guide the material through the system.

The treatment section 120 may generally comprise three regions (or areas, or zones):

optionally, a pre-treatment (or precursor) region 122, a treatment (or plasma) region 124, and optionally, a post-treatment (or finishing) region 126.

The treatment region 124 may comprise components for generating a high voltage (HV) alternating current (AC) atmospheric plasma (AP), the elements of which are generally well known, some of which will be described in some detail hereinbelow.

A laser 130 may be provided, as the secondary energy source, for providing a beam 132 which interacts with the atmospheric plasma (AP) in the main treatment region 124, and which may also impinge on a surface of the substrate 102.

A controller 140 may be provided for controlling the operation of the various components and elements described hereinabove, and may be provided with the usual human interfaces (input, display, etc.).

Figure 2:
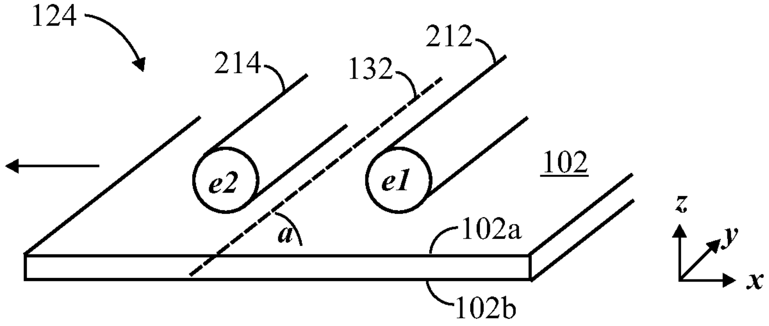
FIG. 2 is a partial perspective view of a plasma region of the treatment system of FIG. 1.

FIG. 2 shows a portion of and some operative elements within the main treatment region 124. Three orthogonal axes x, y and z are illustrated. (In FIG. 1, the corresponding x and y axes are illustrated.)

Two elongate electrodes 212 (e1) and 214 (e2) are shown, one of which may be considered to be a cathode, the other of which may be considered to be an anode. These two electrodes e1 and e2 may be disposed generally parallel with one another, extending parallel to they axis, and spaced apart from one another in the x direction. For example, the electrodes e1 and e2 may be formed in any suitable manner, such as in the form of a rod, or a tube or other rotatable cylindrical electrode material, and spaced apart from one another nominally, a distance sufficient to allow for clearance of the thickness of the material processed. The electrodes e1 and e2 may be disposed approximately 1 mm above the top surface 102*a* of the substrate 102 being treated.

The electrodes e1 and e2 may be energized in any suitable manner to create an atmospheric plasma (AP) along the length of the resulting cathode/anode pair in a space between and immediately surrounding the electrodes e1 and e2, which may be referred to as a "plasma reaction zone".

As mentioned above, a laser beam 132 may be directed into the main treatment region 124, and may also impinge on a surface of the substrate 102. Here, the laser beam 132 is shown being directed approximately along the y axis, approximately parallel to and between the electrodes e1 and e2, and slightly above the top surface 102*a* of the substrate 102, so as to interact with the plasma (plume) generated by the two electrodes e1 and e2. In an exemplary application, the beam footprint may be a rectangle approximately 30 mm×15 mm. The beam may be oriented vertically or horizontally to best achieve the desired interaction of plasma and/or direct substrate irradiation.

The laser beam 132 may be directed minutely but sufficiently "off angle" to directly irradiate the substrate 102 to be treated as it coincidentally reacts with the plasma being generated by the two electrodes e1 and e2. More particularly, the laser beam 132 may make an angle of "a" which is approximately 0 degrees with the top surface 102*a* of the substrate 102 so as not to impinge on its surface 102*a*. Alternatively, the laser beam 132 may make an angle of "a" which is approximately less than 1-10 degrees with the top surface 102*a* of the substrate 102 so as to impinge on its surface 102*a*. Other orientations of the beam 132 are possible, such as perpendicular ("a"=90 degrees) with the surface 102*a* of the substrate 102. The laser beam 132 may be scanned, using conventional galvanometers and the like, to interact with any selected portion of the plasma generated by the two electrodes e1 and e2 or the substrate 102, or both.

The plasma may be created using a first energy source such as high voltage (HV) alternating current (AC). A second, different energy source (such as laser) may be caused to interact with the plasma, resulting in a "hybrid plasma", and the hybrid plasma may be caused to interact (in a treatment region) with the substrate (material) being treated. In addition to interacting with the first energy source, the second energy source can be caused to also interact directly with the material being treated. The direct interaction with the substrate or other gas (secondary or precursor) may produce its' own laser sustained plasma which in turn may further interact with the high voltage generated plasma to more highly energize the reaction milieu.

Figure 2A:
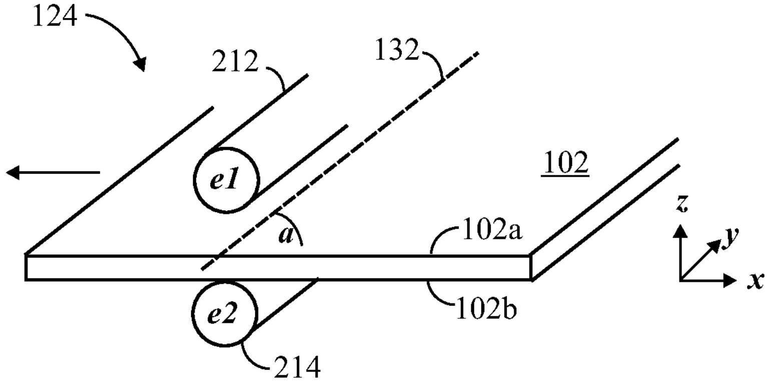
FIG. 2A is a partial perspective view of a plasma region of the treatment system of FIG. 1.

The substrate 102 (material being treated) may be guided by rollers as it passes through the main treatment region (area) 124. FIG. 2A illustrates that one of these rollers 214 may serve as the anode, and the other roller 212 may serve as the cathode (or vice-versa) of a cathode/anode pair for generating the plasma. It may be noted that in FIG. 2, the substrate 102 is disposed to one side of (below, as viewed) both of the two electrodes e1 and e2, and in FIG. 2A the substrate 102 is disposed between the two electrodes e1 and e2. In both cases, the plasma created by the electrodes e1 and e2 acts on at least one surface of the substrate 102. The anodes and cathodes may be coated with an insulating material, such as ceramic.

It should be understood that the invention is not limited to any particular arrangement or configuration of electrodes e1 and e2, and that the examples set forth in FIGS. 2, 2A are intended to be merely illustrative of some of the possibilities.

Furthermore, for example, as an alternative to using two electrodes e1 and e2, a row of plasma jets (not shown) delivering a plasma may be provided to create the desired plasma above the surface 102*a* of the substrate 102.

Figure 3:
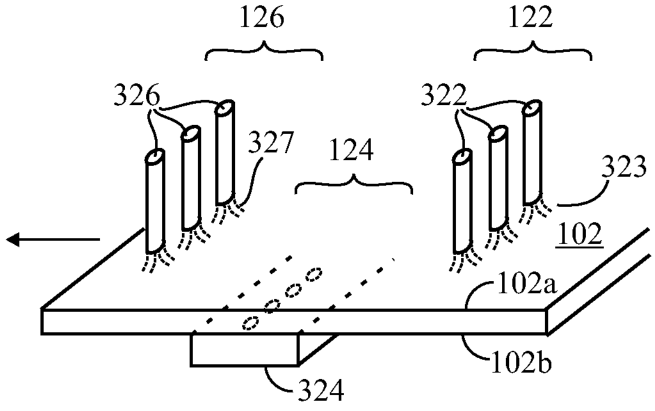
FIG. 3 is a partial perspective view of a pre-treatment region, plasma region and post-treatment region of the treatment system of FIG. 1, according to some embodiments of the invention.

FIG. 3 shows that in the pre-treatment region (area) 122, a row of spray heads (nozzles) 322 covering the full width of the material to be treated, or other suitable means, may be used to dispense precursor materials 323 in solid, liquid or gaseous phase onto the substrate 102 to enable the processing of/for specific properties such as antimicrobial, fire retardant or super-hydrophobic/hydrophilic characteristics.

There may be an intermediate "buffer" zone between the pre-treatment region (area) 122 and the main treatment region (area) 124, to allow time for the materials applied in pre-treatment to soak into (be absorbed by) the substrate. The process still runs a single length of material, but the buffer may hold, for example, up to 200 m of fabric. For example, when material being treated (such as yard goods) is feeding through the system at 20 meters/min, this would allow for several minutes "drying time" between pre-treatment (122) and hybrid plasma treatment (124), without stopping the flow of material through the system.

Similarly, in the post-treatment region (area) 126, a row of spray heads (nozzles) 326 covering the full width of the material which was treated (124), or other suitable means, may be used to dispense finishing materials 327 in solid, liquid or gaseous phase onto the substrate 102 to imbue it with desired characteristics.

Some Embodiments of the Treatment Region (124)

FIGS. 4A-4G illustrate various embodiments of elements in the treatment region 124.

Figure 4A:
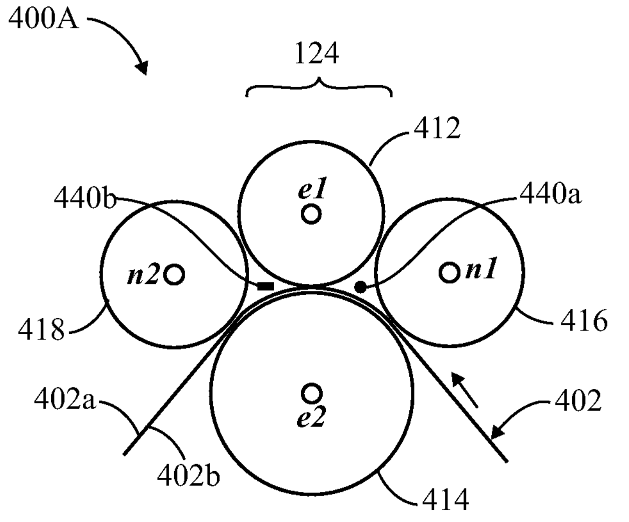
FIGS. 4A-4G are diagrams of elements in a treatment region of the treatment system of FIG. 1, according to some embodiments of the invention.

FIG. 4A illustrates an embodiment 400A wherein:

A first ("top") roller 412 is operative to function as an electrode e1, and may have a diameter of approximately 10 cm, and a length (into the page) of 2 meters. The roller 412 may have a metallic core and a ceramic (electrically insulating) outer surface.

A second ("bottom") roller 414 is operative to function as an electrode e2, and may have a diameter of approximately 15 cm, and a length (into the page) of 2 meters. The roller 414 may have a metallic core and a ceramic (electrically insulating) outer surface.

The second roller 414 is disposed parallel to and directly underneath (as viewed) the first roller 412, with a gap therebetween corresponding to (such as slightly less than) the thickness of the substrate material 402 (compare 102) being fed between the rollers 412 and 414. The direction of material travel may be right-to-left, as indicated by the arrow. The substrate 402 has a top surface 402*a* (compare 102*a*) and a bottom surface 402*b* (compare 102*b*).

The first roller 412 may serve as the "anode" of an anode/cathode pair, having high voltage (HV) supplied thereto. The second roller 414 may serve as the "cathode" of the anode/cathode pair, and may be grounded.

A first ("right") nip or feed roller 416 (n1) is disposed adjacent a bottom-right (as viewed) quadrant of the first roller 412, and against a top-right (as viewed) quadrant of the second roller 414. The roller 416 may have a diameter of approximately 12 cm, and a length (into the page) of 2 meters. The outer surface of the roller 416 may engage the outer surface of the roller 412. A gap between the outer surface of the roller 416 and the outer surface of the roller 414 corresponds to (such as slightly less than) the thickness of the substrate material 402 (compare 102) being fed between the rollers 416 and 414.

A second ("left") nip or feed roller 418 (n2) is disposed adjacent a bottom-left (as viewed) quadrant of the first roller 412, and against a top-left (as viewed) quadrant of the second roller 414. The roller 418 may have a diameter of approximately 12 cm, and a length (into the page) of 2 meters. The outer surface of the roller 418 may engage the outer surface of the roller 412. A gap between the outer surface of the roller 418 and the outer surface of the roller 414 corresponds to (such as slightly less than) the thickness of the substrate material 402 (compare 102) being fed between the rollers 418 and 414.

Generally, the nip or feed rollers 416, 418 should have an insulating outer surface so as to avoid shorting the anode and cathode 412, 414.

With such an arrangement of rollers 412, 414, 416, 418, a semi-airtight cavity ("440") may be formed between the outer surfaces of the four rollers 412, 414, 416, 418 for defining the treatment region 124 and containing the plasma. The overall cavity 440 may comprise a first ("right") portion 440*a* in the space between the top, right and bottom rollers 412, 416, 414 and a second ("left") portion 440*b* in the space between the top, left and bottom rollers 412, 418, 414. The filled circle at the end of the lead line for the right portion 440*a* of the cavity 440 represents gas flow into the cavity. The filled rectangle at the end of the lead line for the left portion 440*b* of the cavity 440 represents the laser beam (132).

The plasma generated in the cavity 440 may be an atmospheric pressure (AP) plasma. Therefore, sealing of the cavity 440 is not necessary. However, end caps or plates (not shown) may be disposed at the ends of the rollers 412, 414, 416, 418 to contain (semi-enclose) and control the gas flow in and out of the cavity 440.

Figure 4B:
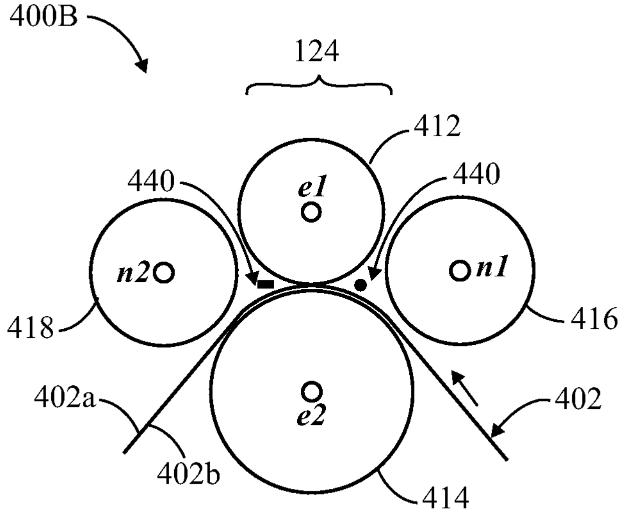

FIG. 4B illustrates an embodiment 400B wherein the left and right rollers 416 and 418 are moved slightly outward from the rollers 412 and 414, thereby opening up the cavity 440 to allow for thicker and/or stiffer substrates to be processed. This would however require independent or direct drive of each electrode, anode and cathode. The material would be driven through the reaction zone by outside feeding and take up rollers.

Figure 4C:
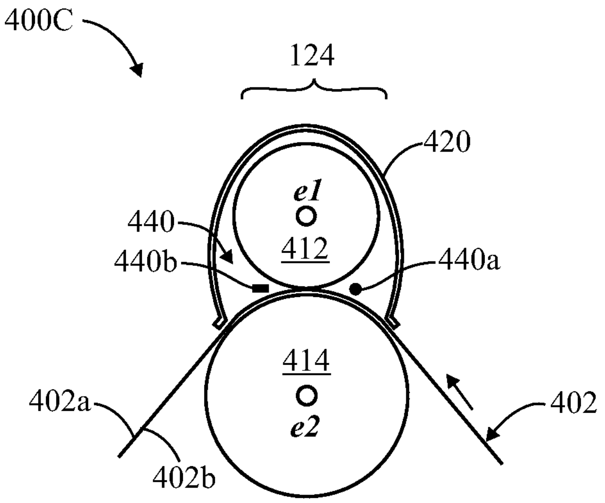

FIG. 4C illustrates an embodiment 400C wherein a generally inverted U-shaped shield 420 is used instead of the left and right rollers (416 and 418) to define the cavity 440 having right and left portions 440*a* and 440*b*. The shield 420 is disposed substantially completely around one roller 412 (except for where the material feeds through), and at least partially around the other roller 414. An additional shield (not shown) could be disposed under the bottom roller 414.

Figure 4D:
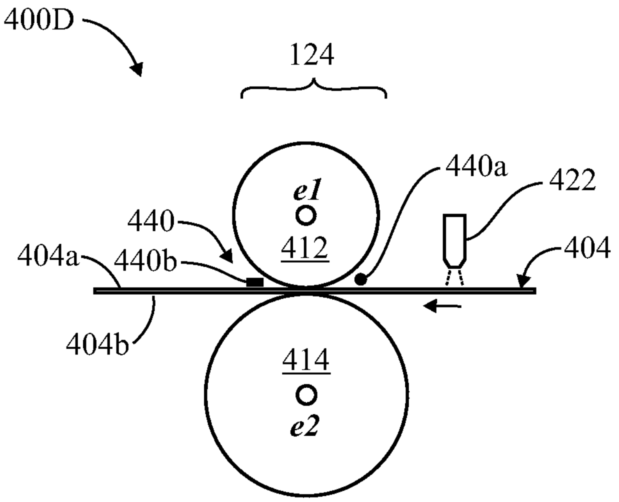

FIG. 4D illustrates an embodiment 400D adapted to treat rigid substrates. The substrate 402 described above was flexible, such as textile. Rigid substrates such as glass for touch-screen displays may also be treated with a hybrid plasma and precursor materials. A rigid substrate 404 having a top surface 404*a* and bottom surface 404*b* passes through the top roller (e1) 412 and the bottom roller (e2) 414. A row of nozzles 422 (compare 322) may be arranged to provide precursor material, such as in liquid, solid or atomized form. A shield (not shown) such as 420 (refer to FIG. 4C) may be incorporated to contain the hybrid plasma.

Figure 4E:
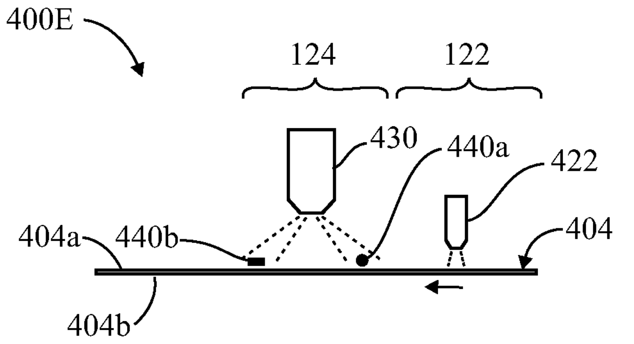

FIG. 4E shows an arrangement 400E incorporating a row of HV plasma nozzles (jets) 430, rather than the cylindrical electrodes e1 and e2. For example, ten jets 430 spaced at 20 cm intervals in the treatment region 124. A rigid substrate 404 is shown. A row of nozzles 422 (compare 322) may be arranged to provide precursor material, such as in atomized form, onto the substrate 404, in a pre-treatment region 122, before it is exposed to the hybrid plasma. For example, ten nozzles 422 spaced at 20 cm intervals in the pre-treatment region 122. A shield (not shown) such as 420 (refer to FIG. 4C) may be incorporated to contain the hybrid plasma. This arrangement enables treatment of metallic or other conductive substrates.

Figure 4F:
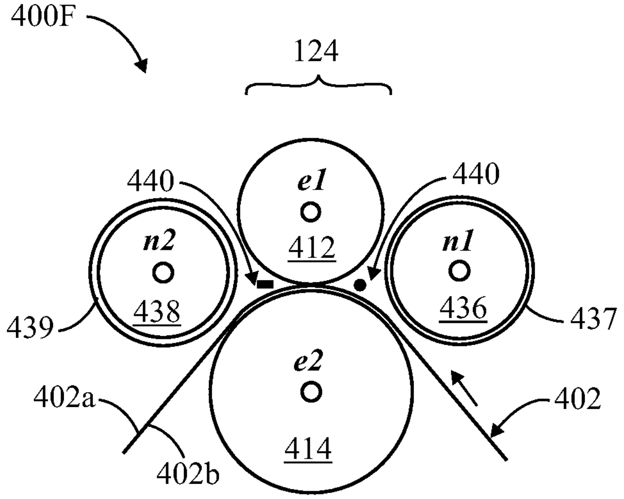

FIG. 4F illustrates an embodiment 400F a first ("top") roller 412 operative to function as an electrode e1 (or anode), a second ("bottom") roller 414 operative to function as an electrode e2 (or cathode), and two nip rollers 436 and 438 (compare 416 and 418).

In contrast with the embodiment 400A (FIG. 4A), in this embodiment the rollers 436 and 438) are spaced outward slightly (such as 1 cm) from the top and bottom rollers 412 and 414. Therefore, although they will still help contain the plasma, they may not function as feed rollers, and separate feed rollers (not shown) may need to be provided.

The right roller 436 (compare 416) is shown having a layer or coating 437 on its surface. The left roller 438 (compare 418) is shown having a layer or coating 439 on its surface. For example, the rollers 436 and 438 in the hybrid plasma treatment region 124 may be wrapped with metallic foil (or otherwise have a metallic outer layer) which may be etched away, in process, by the highly energetic hybrid plasma and/or by the laser (second energy source) creating a plume containing a reactive metallic plasma which may readily couple with the substrate surface radicals to create nano-layer coatings with metallic composition on the substrate material. The metallic material (foil, layer) may be controllably etched or ablated by the plasma, and the effluent metallic constituents may react with the plasma and be deposited on the substrate, such as in nano-scale layers.

The metallic material coating the rollers 436 and 438 may comprise any one or combination of titanium, copper, aluminum, gold or silver, for example. One of the rollers may be coated with one material, the other of the rollers may be coated with another material. Different portions of the rollers 436 and 438 may be coated with different materials. Generally, when these materials are ablated, they form vapor precursor material, in the treatment region 124 (and may therefore be contrasted with the nozzles 322 and 422 providing precursor material in the pre-treatment region 124.)

Figure 4G:
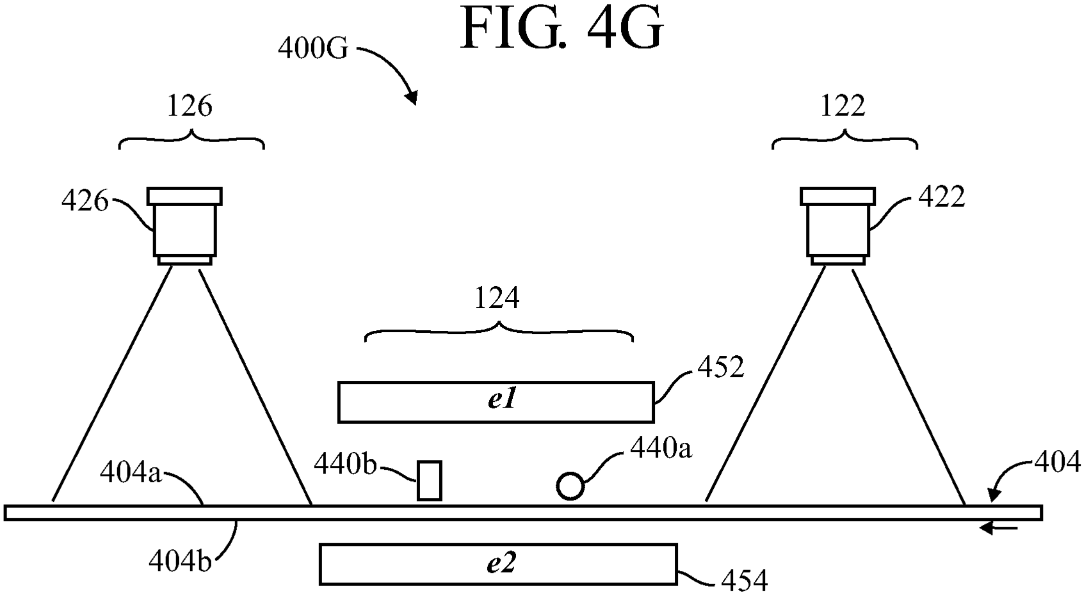

FIG. 4G illustrates an embodiment 400G using two flat sheet, plate electrodes 452 and 454, rather than rollers (412, 414), spaced apart from one another to form a treatment region (reaction/synthesis zone) 124 through which a sheet of material 404 may be fed. Gas feed to the treatment region is indicated by the circle 440*a*, the laser beam is indicated by the rectangle 440*b*. Nozzles 422 may be provided to deliver precursor material(s) in the pre-treatment zone 122. Nozzles 426 may be provided to deliver finishing material(s) in the post-treatment zone 126.

Additional Features

Although not specifically shown, finishing materials dispensed onto the substrate 102 after hybrid energy treatment (124) may be subjected to an immediate secondary plasma or hybrid plasma exposure to dry, seal or react finishing materials which have been dispensed following activation of the surface by the hybrid plasma.

Although not specifically shown, it should be understood that various gases, such as 02, N2, H, CO2, Argon, He, or compounds such as silane or siloxane based materials may be introduced into the plasma, such as in the treatment region 124, to impart various desired characteristics and properties to the treated substrate.

To impart anti-microbial properties to the material being treated, precursor materials may be introduced such as non-silver based silanes/siloxanes and the aluminum chloride family such as 3(trihydroxylsilyl)propyldimethyl octadecyl, ammonium chloride. Other Silane/Siloxane groups may be used to affect hydrophobicity as well as siloxones and ethoxy silanes (to increase hydrophilicity). Hexamethylidisiloxane applied in the gaseous phase in the plasma may smooth the surface of textile fibers and increase the contact angle which is an indication of the level of hydrophobicity.

Negative draft or atmospheric partial vacuum may be employed to draw plasma constituents into and further penetrate the thickness of porous substrates. FIG. 3 shows that suction means, such as platen (bed) 324 over which the substrate 102 passes, in the treatment area 124, may be provided with a plurality of holes and connected in a suitable manner to suction means (not shown) to create the desired effect. The platen 324 may function as one of the electrodes for generating the plasma. Alternatively, a roller or the like could readily be modified (with holes and connected with suction means) to perform this function.

It should be understood that the process is dry and has a low environmental impact, and that leftover or byproduct gases or constituents are inherently safe and may be exhausted from the system and recycled or disposed of in an appropriate manner.

There is thus provided a method of treating materials with at least two energy sources, wherein the two energy sources comprise (i) an AP plasma produced by various gases passing through a high energy electromagnetic field and (ii) at least one laser interacting with said plasma to create a "hybrid plasma". The laser may operate in the ultra-violet wave length range, at 308 nm or less. The laser may comprise an excimer laser operating with at least 25 watts of output power, including more than 100 watts, more than 150 watts, more than 200 watts. The laser may be pulsed, such as at a frequency of 25 Hz or higher, such as 350-400 Hz, including picosecond and femtosecond lasers. Although only one laser has been described interacting with the plasma (and the substrate), it is within the scope of the invention that two or more lasers may be used.

Some exemplary parameters for generating the plasma in the treatment region are 1-2 Kw (kilowatts) for the HV generated plasma and 500 mjoules, 350 Hz for the 308 nm UV laser, in an 80% argon, 20% Oxygen or CO2 gas mix.

As an alternative to or in addition to using a laser, an ultraviolet (UV) source such as a UV lamp or an array of high powered UV LEDs (light-emitting diodes) disposed along the length of the treatment area may be used to direct energy into the AP plasma to create the hybrid plasma, as well as to interact with (such as to etch, react and synthesize upon) the material being treated.

In the main, hereinabove, treating one surface 102*a* of a substrate material 102 was illustrated, and some exemplary treatments were described. It is within the scope of the invention that the opposite bottom surface 102*b* of the material 102 may also be treated, such as by looping the material 102 back through the treatment region 124. Different energy sources and milieus, precursor and finishing materials may be used to treat the second surface of the material. In this manner, both surfaces of the material may be treated. It should also be understood that the treatments may extend to within the surface of the material being treated to alter or enhance properties of the inner (core) material. In some cases, both top and bottom surfaces as well as the core of the material may be effectively treated from one side.

The system can be used to treat materials which are in other than sheet form. For example, the system may be used for improving optical and morphological properties of organic light-emitting diodes (OLEDs) by hybrid energy annealing. These discrete items may be transported (conveyed) through the system in any suitable manner.

Other types of energy may be applied in combination or in sequence with each other to create enhanced processing capabilities. For example, a method of treating materials may utilize the combination of at least two energy sources such as microwave and laser, or microwave and electromagnetically generated plasma, or plasma and microwave, or various combinations of plasma, laser and pulsable microwave electron cyclotron resonance (ECR).

The two energy sources may comprise (i) an atmospheric plasma, utilizing various ionized gases passed through high energy electromagnetic fields, and (ii) an ultra violet (UV) source generating and directing radiation into the highly ionized plasma and directly at the surface to be treated. The UV source may comprise an array of high powered UV LEDs (light-emitting diodes) disposed along the extent of the treatment area. The high powered ultra-violet LEDs may interact with the plasma to more highly energize the plasma, as well as acting directly on the substrate to etch or react said substrate.

An automated material handling system may controllably feed material through the energy fields produced by combination energy sources.

A series of process steps may be performed, such as:

step 1—(optional) precursor application, step 2—exposure to hybrid energy, step 3—(optional) precursor or finishing material application and, step 4—exposure to hybrid energy.

in which all steps are accomplished in serial fashion immediately within the system.

It is within the scope of the invention to introduce into the process a delivery system capable of adding gas/vapor phase precursor materials directly in to the plasma reaction zone.

Some Exemplary Treatment Process Parameters

Treatment 1—Hydrophilicity

Precursor Material polydimethylsiloxane hydroxycut (PMDSO Hydroxycut)

alt: copolymer (Dimethylesiloxane and/or with blend of dimethylesilane)

Laser

| | |
|---|---|
| Frequency | 250 Hz |
| Power | 380 mJ |

Plasma

| | | |
|---|---|---|
| Carrier Gas | Argon | 80% |
| Reactive Gas | O2 | 20% |
| Flow rate | 15 liter/min | |
| Pressure: | slightly above 1 bar | |
| Power | 2 KW | |

Treatment 2—Dyeability

Precursor

Either no precursor or other precursor catalysts

Laser

| | |
|---|---|
| Frequency | 250 Hz |
| Power | 380 mJ |

Plasma

| | | |
|---|---|---|
| Carrier Gas | Argon | 80% |
| Reactive Gas | O2 or N2 | 20% |
| Flow rate | 15 liter/min | |
| Pressure: | slightly above 1 bar | |
| Power | 2 KW | |

Treatment 3—Hydrophobicity

Precursor octamethylcyclotetrasiloxane/polydimethylsilane blend (water soluable, hydrogen methyl polysiloxane mixed with polydimethylsiloxane with polyglycolether (water soluable) or combination of the above with polydimethylsiloxane. Using water soluble blends allows for diluting the materials with de-ionised water to the required concentrations based on the application, cost effectiveness and output performance results. Water soluble blends may be produced with relevant additives—these are essentially methods for mixing oil with water to produce emulsions, generally described by the size of the emulsion dispersant, i.e. macro or micro (macro is >100 microns, micro<30 microns).

alt: copolymer (Dimethylesiloxane and/or with blend of dimethylesilane)

Laser

| | |
|---|---|
| Frequency | at least 350 Hz |
| Power | at least 450 mJ |

Plasma

| | | |
|---|---|---|
| Carrier Gas | Nitrogen, Argon, Helium | 80% |
| Reactive Gas | CO2 or N2 | 2-20% |
| Flow rate | 10-40 liter/min | |
| Pressure: | slightly above 1 bar | |
| Power | 0.5-1 KW | |

Treatment 4—Fire Retardancy

Precursor

Copolymers and Terpolymers based on siloxane/silane and polyborosiloxane with key inorganic compounds, essentially transition oxides of titanium, silicon and zirconium and boron. Also included, Boron containing siloxane Copolymers and Terpolymers, such as organosilicon/oxyethyl modified polyborosiloxane. Some limited material composition based recent new phosphorous blends may be used, based on the substrate material types and output requirements. octamethylcyclotetrasiloxane/polydimethylsilane blend (water soluable) mixed with polydimethylsiloxane with polyglycolether (water soluble) or combination of the above with polydimethylsiloxane with additives of:

calcium metaborbate additive to silane/siloxane.

Silicon oxide additive to silane/siloxane.

Titanium isopropoxide additive.

Titanium dioxide (routile).

Ammonium phosphate.

Aluminum oxide.

Zinc borate.

Boron phosphate containing preceramic oligomores.

Aerogels and hydrogels, low or high density cross linked polyacrylates.

nano/micro encapsulated compositions.

Example dimethylsiloxane and/or with dimethylsilane with polyborosiloxane, with added transition oxides, range 5 to 10% volume of oxides such as Tio2, sio2 (fumed, gel or amorphous), Al2O3, etc. The precursor materials set forth herein may enhance fire retardency of materials in the system described herein utilizing a hybrid plasma (e.g., with laser). It is within the scope of the invention that the precursor materials set forth herein may enhance fire retardency (or other properties) of materials in a material treatment system utilizing a non-hybrid plasma (e.g., without the laser).

Laser

| | |
|---|---|
| Frequency | at least 350 Hz |
| Power | at least 450 mJ |

Plasma

| | | |
|---|---|---|
| Carrier Gas | Nitrogen, Argon, Helium | 80% |
| Reactive Gas | CO2 or N2 | 2-20% |
| Flow rate | 10-20 liter/min | |
| Pressure: | slightly above 1 bar | |
| Power | 0.5-1 KW | |

Treatment 5—Anti Microbial

Precursor siloxane/silane blends as per hydrophobicity platform, with the addition of octadecyldimethyl (3triethoxysilpropyl)ammonium chloride. octamethylcyclotetrasiloxane/polydimethylsilane blend (water soluble) mixed with polydimethylsiloxane with polyglycolether (water soluble) or combination of above with polydimethylsiloxane with additives of:

octadecyldimethyl(3-trimethoxysilylpropyl)ammonium chloride),

Chitosan

Laser

| | |
|---|---|
| Frequency | at least 350 Hz |
| Power | at least 450 mJ |

Plasma

| | | |
|---|---|---|
| Carrier Gas | Nitrogen, Argon, Helium | 80% |
| Reactive Gas | CO2 or N2 | 2-20% |
| Flow rate | 10-20 liter/min | |
| Pressure: | slightly above 1 bar | |
| Power | 0.5-1 KW | |

While the invention(s) has been described with respect to a limited number of embodiments, these should not be construed as limitations on the scope of the invention(s), but rather as examples of some of the embodiments. Those skilled in the art may envision other possible variations, modifications, and implementations that are should also be considered to be within the scope of the invention(s), based on the disclosure(s) set forth herein, and as may be claimed.

What is claimed is:

1. A method for treating a substrate comprising:

creating a high voltage alternating current atmospheric plasma by energizing two spaced-apart electrodes in a treatment region;

directing a laser beam into the plasma; and shaping the laser beam to have a rectangular cross-section;

wherein the laser beam interacts with the plasma, resulting in a hybrid plasma, and the laser beam also acts directly upon the substrate being treated; and wherein the beam from the laser is directed into the treatment region, at an angle greater than 0 degrees and less than 10 degrees, horizontal to a top surface of the substrate, so as to impinge on the surface of the substrate.

2. The method of claim 1, wherein the laser has at least one of the following characteristics:

the laser comprises an excimer laser;

the laser operates in the ultra-violet wave length range;

the laser operates with at least 25 watts of output power.

3. The method of claim 1, further comprising:

prior to treating the substrate, dispensing precursor materials onto the substrate.

4. The method of claim 1, further comprising:

after treating the substrate, dispensing finishing materials onto the substrate.

5. The method of claim 1, wherein:

the electrodes comprise rollers.

6. The method of claim 1, further comprising:

pulsing the laser radiation to create plasma waves.

7. The method of claim 1, wherein:

the two spaced-apart electrodes comprise first and second rollers.

8. The method of claim 7, further comprising:

providing third and fourth rollers disposed adjacent the first and second rollers and forming a semi-airtight cavity between outer surfaces of the first, second, third and fourth rollers for defining the treatment region and for containing the plasma.

9. The method of claim 8, further comprising:

providing a metallic outer layer on at least one of the third and fourth rollers.

10. The method of claim 7, further comprising:

disposing a shield around the first and second rollers to define the cavity.

11. The method of claim 7, wherein:

the first and second rollers are disposed parallel with one another, with a gap therebetween, to allow the substrate to be fed between the rollers.

12. The method of claim 1, wherein:

the substrate comprises a fibrous textile material.

13. The method of claim 1, wherein:

the substrate is a material selected from the group consisting of organic textiles and inorganic textiles.

14. The method of claim 1, wherein:

the substrate is a material selected from the group consisting of paper, synthetic paper, and plastic.

15. The method of claim 1, wherein:

a beam from the laser is directed into the treatment region so as to impinge on the surface of the substrate.

16. The method of claim 1, wherein:

the electrodes are elongate; and a beam from the laser is directed into the treatment region approximately parallel to and between the electrodes.

17. The method of claim 1, wherein:

treating the substrate is selected from the group consisting of cleaning, preparation and performance enhancement of materials.

* * * * *